J. H. O'BRIEN.
HORSE DETACHING APPARATUS.

No. 171,242. Patented Dec. 21, 1875.

WITNESSES.           INVENTOR.

O. D. Levis            James H. O'Brien
J. H. O'Brien

UNITED STATES PATENT OFFICE.

JAMES H. O'BRIEN, OF PITTSBURG, PENNSYLVANIA.

IMPROVEMENT IN HORSE-DETACHING APPARATUS.

Specification forming part of Letters Patent No. 171,242, dated December 21, 1875; application filed September 18, 1875.

*To all whom it may concern:*

Be it known that I, JAMES H. O'BRIEN, of the city of Pittsburg, county of Allegheny and State of Pennsylvania, have invented a new and useful Improvement in the Manner of Attaching Horses to Vehicles and detaching them in a moment's time, of which the following is a specification:

The object of my invention is to enable the driver or any person seated in a vehicle to detach the horse from it at any time when desired, so that in case a horse should become unmanageable the danger to life and injury to the vehicle may be avoided; and to this end it consists in a flanged hook, constructed to engage with a pin on the whiffletree and with a spring-block, provided with guides and opening, whereby, when said block is raised by means of a strap, the hook will be first raised and disconnected from the pin, after which a strain upon the trace will withdraw it from the said block, substantially as hereinafter set forth and claimed.

Figure 1:
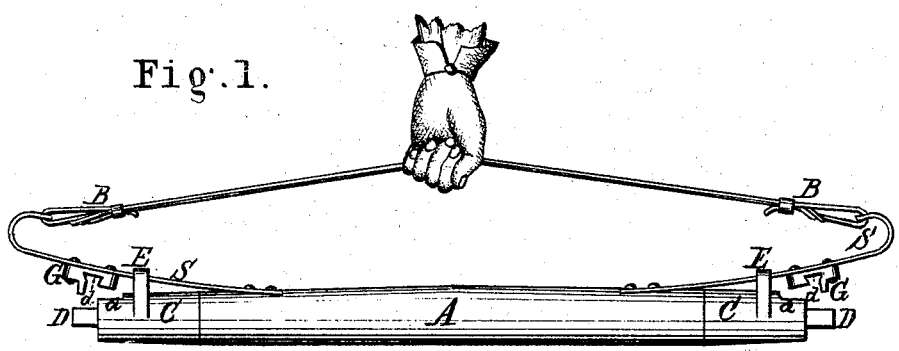
Figure 2:
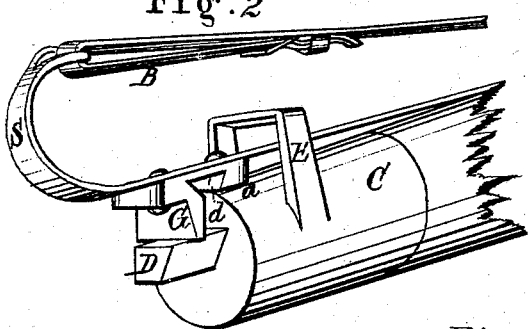
Figure 4:
Figure 3:
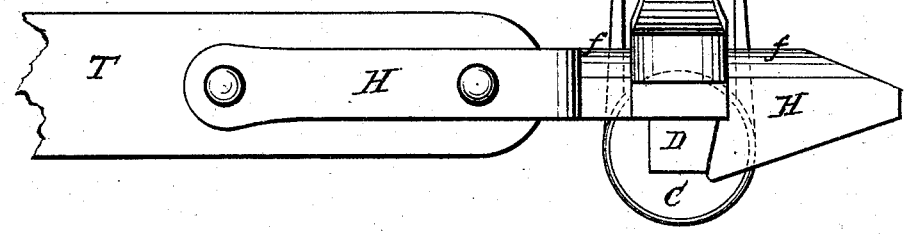

In the accompanying drawings, Figure 1 is a side view of a whiffletree provided with a pin and spring-block constructed in accordance with my invention, and illustrating the manner in which the spring-block is raised therefrom. Fig. 2 is an enlarged perspective view, showing more clearly the construction of the above device; and Fig. 3 is an end view, showing the flanged trace-hook as engaged with the pin and spring-block.

On top of the single-tree A, between the ferrules C and the center, are the springs S, extending a little beyond the ends of the singletree, and there curved upward and inward, terminating in suitable rings or openings, through which the ends of the strap B are passed and buckled. The strap B, attached to the springs S, is not tightened to interfere with the action of the springs, but left slack enough to allow the springs to press downward. On top of the ferrules C are the guards E, which guide and protect the springs. Outside of the guards a shoulder, a, is cut in the top of the ferrules, upon which a part of the block G rests, which block is rigidly secured by screws or rivets under and to the springs S. The form of the block G is such as represented in the accompanying drawing, one of its projections resting upon the shoulder a, and the other upon the outer ends of the blocks D, leaving an opening, d, between them, which opening is provided with guides in its upper part. To the ends of the traces T are attached, by rivets or otherwise, the hooks H, which hooks are passed through the opening d, and catch against the beveled sides of the blocks D. The shanks of the hooks are provided with flanges f at the upper edges, which flanges enter the guides in the openings d. The springs, pressing downward, hold the hooks securely in this position, so that it is unnecessary to apply the ordinary means for preventing the traces from falling off.

Should a horse become unruly or run away with the vehicle, the driver, by pulling the strap B in front of him, lifts the springs S and the blocks G, through which the shanks of the hooks pass. The flanges f of these shanks, occupying the openings d, cause the hooks to be lifted with the springs, and the moment the hooks are withdrawn from behind the blocks D the horse, pulling at the traces, is set free.

Having thus described my invention, I claim—

A device for connecting and disconnecting traces from a whiffletree, consisting of the flanged hook H, pin D, and spring-block G, constructed with an opening, d, having guides for the flanges of the hook, whereby said hook is raised and disconnected from the pin of the whiffletree, substantially as shown and specified.

JAMES H. O'BRIEN.

Witnesses:
O. D. LEVIS,
H. B. DURANT.